United States Patent [19]

Palmer et al.

[11] Patent Number: 5,116,170
[45] Date of Patent: May 26, 1992

[54] DRILL JIG FOR PREPARING A DOOR TO RECEIVE A CYLINDRICAL LOCK

[75] Inventors: Ralph P. Palmer, Indianapolis; David A. Whitmoyer, Lapel; Mark A. Shumaker, Indianapolis, all of Ind.

[73] Assignee: Best Lock Corporation, Indianapolis, Ind.

[21] Appl. No.: 660,337

[22] Filed: Feb. 22, 1991

[51] Int. Cl.⁵ .............................................. B23B 49/02
[52] U.S. Cl. ............................... 408/72 B; 408/115 B
[58] Field of Search ................ 408/72 R, 72 B, 79, 408/115 R, 115 B, 103

[56] References Cited

U.S. PATENT DOCUMENTS

| | | | |
|---|---|---|---|
| 2,355,263 | 8/1944 | Bloomfield | 408/115 R |
| 2,466,023 | 4/1949 | Griffin | 408/79 |
| 2,698,547 | 1/1955 | Armacost | 408/72 B |
| 2,725,639 | 12/1955 | Yungman | 408/72 B |
| 2,780,946 | 2/1957 | McGuire | 408/72 R |
| 2,804,788 | 9/1957 | Humphrey | 408/115 R |
| 2,920,509 | 1/1960 | Bennett | 408/72 B |
| 3,097,891 | 7/1963 | Brideau | 408/72 B |
| 4,474,514 | 10/1984 | Jensen | 408/72 B |
| 4,752,162 | 6/1988 | Groh | 408/72 R |
| 4,986,702 | 1/1991 | McKinney | 408/72 B |

FOREIGN PATENT DOCUMENTS

| | | | |
|---|---|---|---|
| 548812 | 10/1942 | United Kingdom | 408/72 B |
| 819859 | 9/1959 | United Kingdom | 408/72 R |

Primary Examiner—Daniel W. Howell
Attorney, Agent, or Firm—Barnes & Thornburg

[57] ABSTRACT

A door preparation drill jig is usable to prepare a door to receive a lockset provided with through-bolt mounting studs in a main bore provided in the door. The drill jig has a planar body, drill guides, and a cylindrical body. The front surface of the planar body has a portion for the placement of installation instructions and the attachment of a C-clamp. Each drill guide is arranged to receive a drill bit used to drill one of the mounting holes for receiving a mounting stud of the lockset. The cylindrical body has a chamfered edged latch slot which receives a portion of the latch extending into the main bore of the door. Additional tabs appended to the cylindrical body flex to ensue the chamfered edges around the border of the latch slot firmly engage the latch in the main bore and another flexible tab flexes to ensure a tight fit of the jig in the main bore of the door.

18 Claims, 2 Drawing Sheets

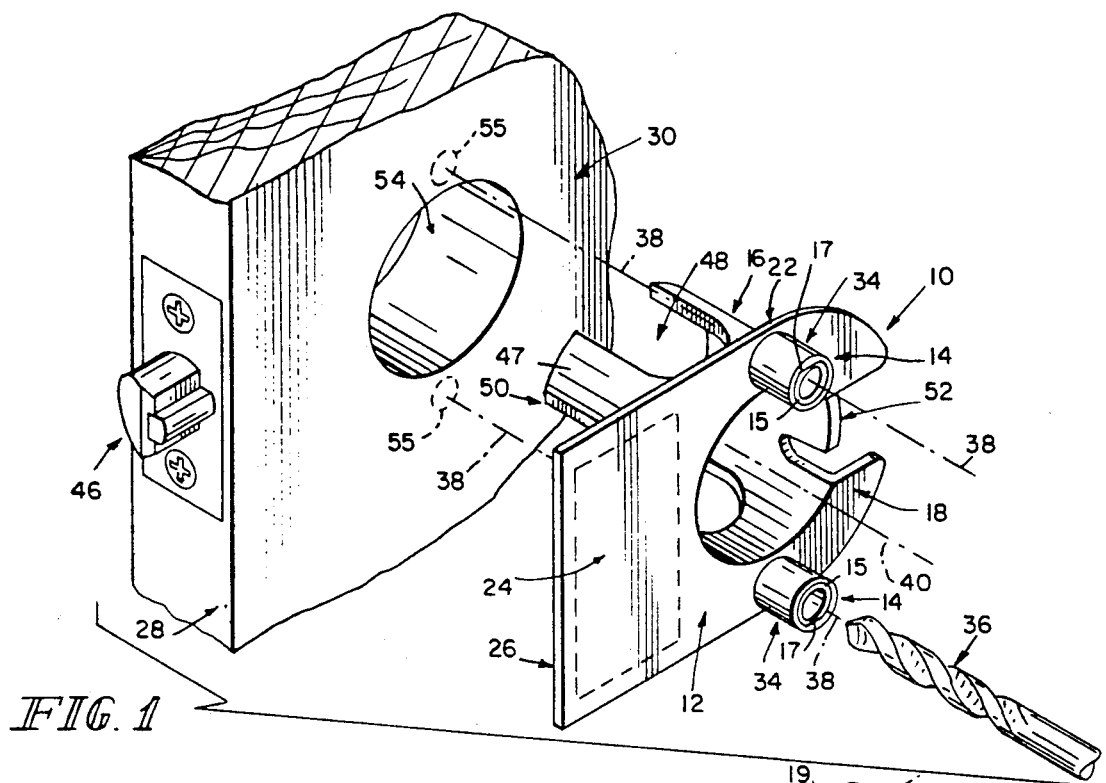
FIG. 1
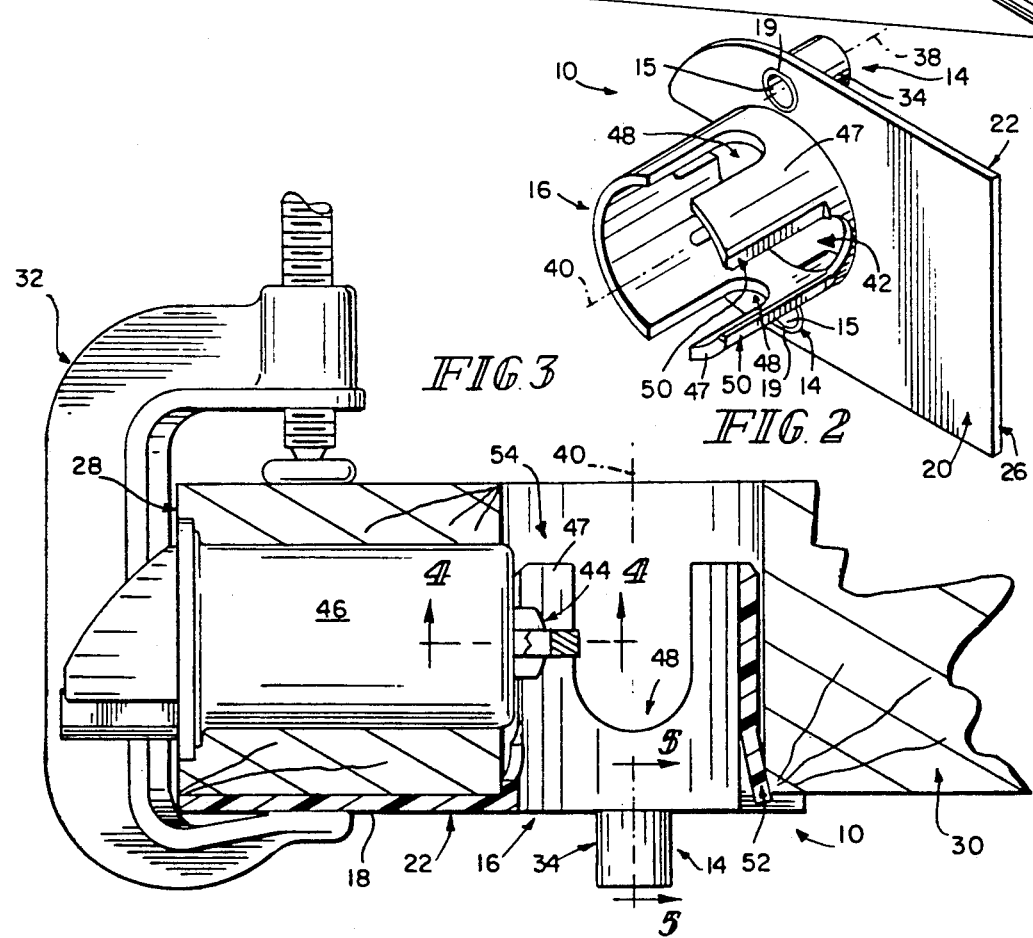
FIG. 2
FIG. 3

DRILL JIG FOR PREPARING A DOOR TO RECEIVE A CYLINDRICAL LOCK

BACKGROUND AND SUMMARY OF THE INVENTION

This invention relates to a drill jig, and particularly to a drill jig for use in preparing a door to receive a cylindrical lockset provided with through-bolt mounting studs.

Locksets intended for installation in a door are commonly packaged with hardware, instructions, and one or more templates to aid in the drilling of holes and other installation steps.

Generally, the templates were made of paper. There are several problems associated with the use of paper templates. Paper templates crease and tear thus making them difficult to use. The fragility of paper templates also renders them unsuitable for repeated use. Paper templates only provide marking points for the mounting holes, but still allow improper alignment, perpendicularity, or sizing of mounting holes. This inaccurate door preparation can allow excessive chassis rotation and drooping or sagging lever handles, and occasionally can inhibit proper lockset function.

The drill jig of this invention is designed to overcome the problems associated with such previous paper templates. The jig can be easily and economically manufactured from materials which retain adequate strength and shape for subsequent use. The drill jig of the present invention was developed to ensure proper hole size and to accurately align and drill mounting holes during door preparation for a through-bolt type of door trim.

According to the present invention, a drill jig is provided for preparing a door to receive a lockset provided with through-bolt or anti-rotation studs. The drill jig comprises a planar body having a front surface and a back surface joined by a perimetral edge. The planar body has at least two fixed metal bushings. Each metal bushing includes an aperture sized to receive a drill bit therein. The front surface has a portion for receiving a C-clamp to hold the drill jig in a fixed position in a door and a portion for displaying printed installation instructions. The perimetral edge includes a linear vertical portion for squaring with an edge of the door. The metal bushings of the jig provide adequate guidance and support for the drill bit to prevent improperly aligned, placed, or sized mounting holes.

A cylindrical body is appended to the planar body and oriented to extend in a perpendicular direction away from the back surface of the planar body. The cylindrical body has a latch slot that is sized to receive a latch therein to provide proper alignment and location of the mounting holes with respect to the lock chassis and to prevent rotation of the drill jig while drilling the mounting holes. The latch slot has chamfered edges that face the latch back plate and engage the latch plate to prevent rotation of the jig which might otherwise happen as the mounting holes are being drilled. The cylindrical body includes additional slots for flexing to ensure that the chamfered edges of the latch slot firmly engage the latch back plate. The cylindrical body also includes a tab for flexing to ensure a tight fit into the main bore of the door.

Preferably, the drill jig is injection-molded or otherwise formed of plastic. A plastic jig has the advantage of being manufactured easily and economically by injection-molding. Unlike paper templates, such a plastic jig retains adequate strength and shape for repeated use. The metal bushings provide strength and support to prevent the rotating drill bit from wandering off-center and from causing oversized mounting holes.

In a preferred embodiment, the frontal area of the jig is large enough to allow the attachment of a C-clamp, eliminating the need to hold the jig manually while drilling. This feature has the advantage of providing a frontal area for the jig which is also large enough to allow the placement of molded-in installation instructions, eliminating the need for printed paper instructions. A linear vertical portion of the jig also allows the jig to be squared with an edge of the door if a latch is not available or installed.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is an exploded perspective view showing a door preparation drill jig in accordance with the present invention as it is about to be inserted into a main bore in a door having a latch assembly already mounted therein, and showing a drill bit as it is about to be inserted into a bit-guiding bushing appended to the jig;

FIG. 2 is a perspective view of the reverse side of the door preparation drill jig illustrated in FIG. 1;

FIG. 3 is a horizontal sectional view of a door preparation drill jig taken through the door showing use of a C-clamp to hold the jig in place on the door;

DETAILED DESCRIPTION OF THE DRAWINGS

Figure 4:
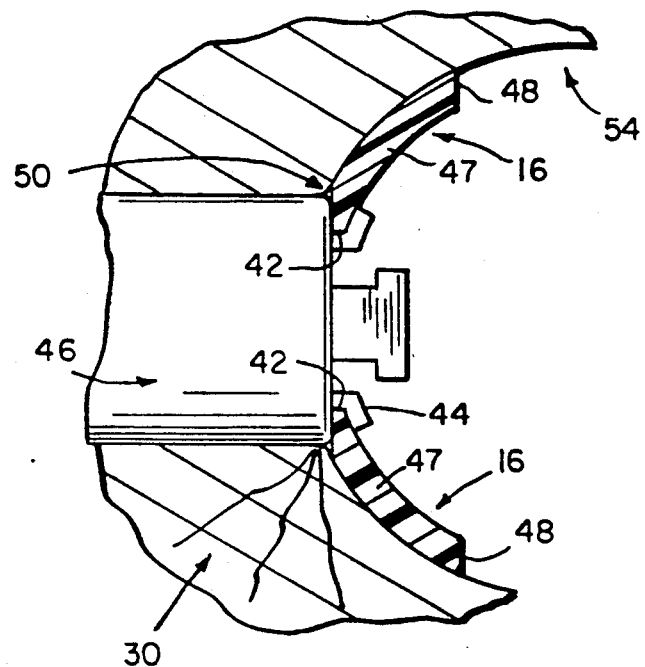
FIG. 4 is a sectional view taken along line 4—4 of FIG. 3.

A door preparation drill jig 10 has a planar body 12, drill guides 14, and a cylindrical body 16 as shown in FIGS. 1 and 2. The planar body 12 has a front surface 18, a back surface 20, and a perimetral edge 22. The front surface 18 includes an information portion 24 configured to display installation instructions which pertain to proper door preparation and eliminate the need for additional instructions printed on paper. The perimetral edge 22 also includes a linear vertical portion 26 for visual alignment with the edge 28 of a door 30. Thus, the drill jig 10 can be squared with the door 30 so that the drill guides 14 will be in proper alignment relative to a latch 46 mounted in door 30. The front surface portion 24 of jig 10 provides an area for receiving a C-clamp 32 so that the C-clamp 32 can be used to fix the jig 10 rigidly to door 30 as shown in FIG. 3.

The drill guides 14 of jig 10 include a pair of metal bushings 15 that are fixed within apertures formed in cylindrical bushing housings 34 appended to the planar body 12. The cylindrical bushing housings 34 project outward from the front surface 18 of drill jig 10 to receive the metal bushings 15 therein such that the axes 38 of the metal bushings 15 are substantially parallel to the axis 40 of the cylindrical body 16. Placement of one of metal bushings 15 in the through aperture in a cylindrical bushing housing 34 is shown best in FIG. 5.

Figure 5:
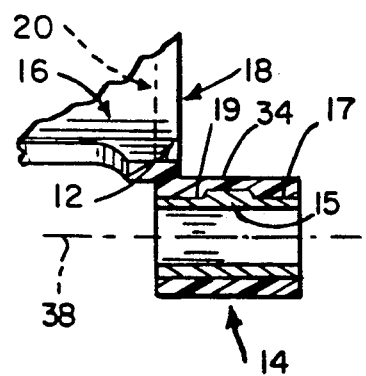
FIG. 5 is a sectional view taken along line 5—5 of FIG. 3.

Each bushing 15 is manufactured so that it has a flat wall 17, 19 at each end as shown best in FIGS. 5, 1, and 2. In the illustrated embodiment, the bushing housing 34 is made of plastics material and molded around the metal bushing 15. The flats 17, 19 on each end of bushing 15 cause each end of the bushing to have a D-shaped cross section that prevents rotation of the bushing 15 in the housing 34 about the central longitudinal axis of the bushing 15. Flat wall 17 is shown in FIG. 1 and flat wall 19 is shown in FIG. 2. Essentially, the bushing 15 is configured to engage its housing 34 such that the bushing 15 is not easily rotatable about its longitudinal axis within the housing 34.

The cylindrical body 16 is best illustrated in FIG. 2 which shows a perspective view of the reverse side of the door preparation drill jig 10. The cylindrical body 16 includes an axially extending latch slot 42 for receiving therein the latch back plate 44 of latch 46 as illustrated in cross section in FIG. 4. The cylindrical body 16 also includes additional axially extending tabs 47 between slots 48 and slot 42. These flexible tabs 47 flex to ensure a tight fit against latch back plate 44 as shown in FIG. 4. The edges 50 of latch slot 42 are chamfered to fit well against the latch back plate 44 and ensure a firm locking engagement between the latch 46 and the jig 10. The cylindrical body 16 further includes another flexible tab 52 which engages in the main bore 54 of door 30. This engagement is illustrated in FIG. 3.

One preferred embodiment of the door preparation drill jig 10 is constructed of injection-molded plastic having drill guides 14 made of fixed metal bushings 15 fixed within the cylindrical housings 34. However this is not the only material from which the drill jig planar and cylindrical bodies can be constructed. Other suitable materials can be used, such as metal, pressed wood, or the like.

In use, the cylindrical body 16 fits snugly into a main bore 54 of door 30 with the latch back plate 44 fixed in the latch slot 42. The additional tabs 47 can flex somewhat to ensure a firm engagement of the chamfered edges 50 of the latch slot 42 with the latch back plate 44, and the flexible tab 52 flexes into firm engagement with bore 54 of door 30. The latch slot 42 is located to ensure proper alignment of the drill guides 14 in relation to the latch 46 and, in conjunction with flexible tab 52, serves as an anti-rotational stop surface preventing rotation of jig 10 relative to door 30 during the drilling of the mounting holes. Referring to FIG. 1, phantom circles 55 are drawn on the front face of door 30 to show where mounting holes will be formed after mounting jig 10 on door 30 and drilling a hole using a drill bit 36 projected into each of drill guides 14.

The linear vertical portion 26 of jig 10 allows the operator to square the jig 10 with the edge 28 of the door 30 so that the drill guides 14 are in proper alignment. The operator has the option of using a C-clamp 32 as shown in FIG. 3 to eliminate the need to hold drill jig 10 manually while drilling the door 30. The operator then drills a mounting hole 55 in line with each drill guide 14 using a drill bit 36. When the mounting holes 55 have been drilled, the operator removes the C-clamp 32, if it was placed on drill jig 10, and removes the jig 10 from the main bore 54 of door 30. The operator then installs a conventional lock chassis (not illustrated) and retains drill jig 10 for subsequent use.

The drill jig 10 is easily manufactured and economically produced by the injection-molding process. The (molded-in) hardened steel bushings provide adequate bearing and hardness to ensure proper hole size and location. The large front surface area is provided to allow the use of a C-clamp, if so desired, to further maintain drill jig during door preparation. The cylindrical shaped body fits tightly into the 2⅛' bore by the use of a special flexible tab and incorporates a flexible slotted feature which engages with the latch to ensure proper alignment in relation to the chassis while preventing the jig from rotating while drilling the door. The product has a horizontal edge to aid in quick visual alignment which can be used in conjunction with a leveling device if a latch is unavailable. The front surface area also contains necessary (molded-in) information regarding proper door preparation, eliminating the need for additional instructions printed on paper.

Although the invention has been described in detail with reference to certain preferred embodiments, variations and modifications exist within the scope and spirit of the invention as described and defined in the following claims.

What is claimed is:

1. A door preparation drill jig mountable in a main bore formed in a door prior to insertion of a latch-actuating lockset in the main bore, the drill jig comprising
an exterior member formed to include at least one drill guide, the exterior member including a plate having a flat surface abutting the door, and
means for mounting the exterior member to the door, the mounting means extending into the main bore to locate the exterior member and the at least one drill guide in a mounted position on the door so that each drill guide is oriented to face the door and aim a drill bit received therein at a portion of the door to be drilled to provide a lockset mounting hole adjacent tot he main bore, the mounting means including a cylindrical body sized to fit int he empty main bore of the door and being configured to include flexible tabs yieldably engaging in interior wall in the main bore to cause the cylindrical body to fit snugly in the main bore of the door.

2. A door preparation drill jig mountable in a main bore formed in a door in combination with a latch mounted in the door and oriented to extend into the main bore, the drill jig comprising
an exterior member formed to include at least one drill guide, and
means for mounting the exterior member to the door, the mounting means extending into the main bore and including means for engaging a portion of the latch extending into the main bore to anchor the drill jig to the door so as to locate the exterior member and at least one drill guide in a mounted position on the door so that each drill guide is oriented to face the door and aim a drill bit received therein at a portion of the door to be drilled to provide a lockset mounting hole adjacent to the main bore.

3. The drill jig of claim 2, wherein said portion of the latch includes a back plate and the engaging means includes a pair of flexible tabs arranged in spaced-apart relation to define a slot therebetween sized to receive the back plate therein.

4. A jig for preparing a door to receive a lockset, the jig comprising
a cylindrical body configured to extend into a main bore formed in the door to receive the lockset, the cylindrical body including a latch slot for receiving a latch back plate included in the lockset, at least two bushings for receiving a drill bit, and means for fixing the bushings in a fixed position relative to the cylindrical body.

5. The jig of claim 4, wherein edges defining the latch slot are chamfered to engage the latch back plate.

6. The jig of claim 4, wherein the cylindrical body includes additional tabs for flexing to ensure a tight fit against the latch back plate.

7. A jig for preparing a door to receive a lockset, the jig comprising a cylindrical body configured to extend into a main bore formed in the door to receive the lockset, the cylindrical body including a flexible tab configured to engage the main bore of the door, at least two bushing for receiving a drill bit, and means for fixing the bushings in a fixed position relative to the cylindrical body.

8. The jig of claim 7, wherein the fixing means includes at least one exterior flat wall formed on each bushing and arranged to abut the cylindrical body.

9. A jig for preparing a door to receive a lockset, the door being formed to include a main bore extending therethrough and sized to receive the lockset therein, the jig comprising a cylindrical body having a longitudinal axis and being configured to fit in the main bore formed in the door so that the cylindrical body is fixed against movement relative to the door the cylindrical body including a flexible tab for engaging in the main bore of the door, at least two drill guides providing means for receiving a drill bit, each drill guide having an axis defining the drill bit attitude, and means for fixing the drill guides in a fixed position relative to the cylindrical body such that the axes of the cylinder and the drill guides are parallel relative to one another.

10. A jig for preparing a door to receive a lockset, the door being formed to include a main bore extending therethrough and sized to receive the lockset therein, the jig comprising a cylindrical body having a longitudinal axis and being configured to fit in the main bore formed in the door, the cylindrical body including a latch slot for receiving a latch back plate of the lockset therein, at least two drill guides providing means for receiving a drill bit, each drill guide having an axis defining the drill bit attitude, and means for fixing the drill guides in a fixed position relative to the cylindrical body such that the axes of the cylinder and the drill guides are parallel relative to one another.

11. The jig of claim 10, wherein edges defining the latch slot are chamfered to engage the latch back plate.

12. The jig of claim 10, wherein the cylindrical body includes additional tabs for flexing to ensure a tight fit against the latch back plate.

13. A jig for preparing a door to receive a lockset, the door being formed to include a main bore extending therethrough and sized to receive the lockset therein, the jig comprising a cylindrical body having a longitudinal axis and being configured to fit in the main bore formed in the door, the cylindrical body including a flexible tab for engaging in the main bore of the door, at least two drill guides providing means for receiving a drill bit, each drill guide having an axis defining the drill bit attitude, and means for fixing the drill guides in a fixed position relative to the cylindrical body such that the axes of the cylinder and the drill guides are parallel relative to one another.

14. A jig for preparing a door to receive a lockset, the jig comprising a planar body having a front surface and a back surface joined by a perimetral edge, at least two cylindrically shaped drill guides perpendicularly fixed to the front surface of the planar body and configured to provide means for receiving a drill bit therein, and a cylindrical body fixed perpendicular to the back surface, the cylindrical body including a flexible tab for engaging in the main bore of the door.

15. The jig of claim 14, wherein the planar body and the cylindrical body are formed from a unitary piece of material.

16. The jig of claim 14, wherein the perimetral edge includes a squaring means for squaring with a front edge of a door, the squaring means extending from the cylindrical body to the front edge of the door to position the at least two drill guides in a predetermined drilling location.

17. A door preparation drill jig mountable in a main bore formed in a door prior to insertion of a latch-actuating lockset in the main bore, the drill jig comprising an exterior member formed to include at least one drill guide, and means for fixedly mounting the exterior member to the door, the mounting means extending into the main bore and including means for engaging a latch-actuating lockset positioned in the main bore to hold the at least one drill guide in a predetermined fixed position on the door.

18. The drill jig of claim 17, wherein the door includes a front edge and the exterior member includes two drill guides in spaced-apart relation to one another and squaring means for squaring with the front edge of the door so that the two drill guides are oriented to lie on a line parallel with the front edge of the door.

* * * * *